(12) United States Patent
Lawrence

(10) Patent No.: US 9,254,417 B2
(45) Date of Patent: Feb. 9, 2016

(54) SPRINT TRAINER AID

(71) Applicant: Wendell Lawrence, Meridian, ID (US)

(72) Inventor: Wendell Lawrence, Meridian, ID (US)

( * ) Notice: Subject to any disclaimer, the term of this patent is extended or adjusted under 35 U.S.C. 154(b) by 0 days.

(21) Appl. No.: 14/263,770

(22) Filed: Apr. 28, 2014

(65) Prior Publication Data

US 2014/0323270 A1    Oct. 30, 2014

Related U.S. Application Data

(63) Continuation of application No. 13/043,351, filed on Mar. 8, 2011, now abandoned.

(60) Provisional application No. 61/311,593, filed on Mar. 8, 2010, provisional application No. 61/316,145, filed on Mar. 22, 2010.

(51) Int. Cl.
    *A63B 71/00* (2006.01)
    *A63B 24/00* (2006.01)

(52) U.S. Cl.
    CPC ...................................... *A63B 24/00* (2013.01)

(58) Field of Classification Search
    CPC .................................................. A63B 24/00
    USPC ............................................. 482/1–9, 51, 55
    IPC ....................................................... A63B 24/00
    See application file for complete search history.

(56) References Cited

U.S. PATENT DOCUMENTS

| | | | | | |
|---|---|---|---|---|---|
| 3,739,728 | A | * | 6/1973 | Thompson | 104/173.2 |
| 4,469,324 | A | * | 9/1984 | Dolan | 482/7 |
| 5,391,080 | A | * | 2/1995 | Bernacki et al. | 434/254 |
| 6,152,854 | A | * | 11/2000 | Carmein | 482/4 |
| 7,175,569 | B1 | * | 2/2007 | Lan et al. | 482/55 |
| 7,608,015 | B2 | * | 10/2009 | Radow | 482/4 |
| 7,998,030 | B2 | * | 8/2011 | Wroclawsky | 482/51 |
| 8,167,620 | B1 | * | 5/2012 | Baker et al. | 434/219 |
| 2004/0087418 | A1 | * | 5/2004 | Eldridge | 482/54 |

* cited by examiner

*Primary Examiner* — Glenn Richman

(74) *Attorney, Agent, or Firm* — Robert L. Shaver; Shaver & Swanson, LLP

(57) ABSTRACT

Disclosed is a sprinter training aid which pulls the sprinter forward in an over speed condition, for the purpose of exercise the muscles which pull the leg forward when running, such the hip flexor muscles. Two devices can be used, one pulling the sprinter forward and one pulling the sprinter backward at the start of a run. The backward pulling at the start of the run exercises the sprinter's muscles which are used when going from a stationary position, to a full speed sprint. The device which pulls the sprinter forward would take over when the rearward pulling device shut off, and pull the sprinter to an over speed condition. Include in the device is a cable and cable winder, and a motor, computer, and a wireless connection to a data compilation computer.

21 Claims, 2 Drawing Sheets

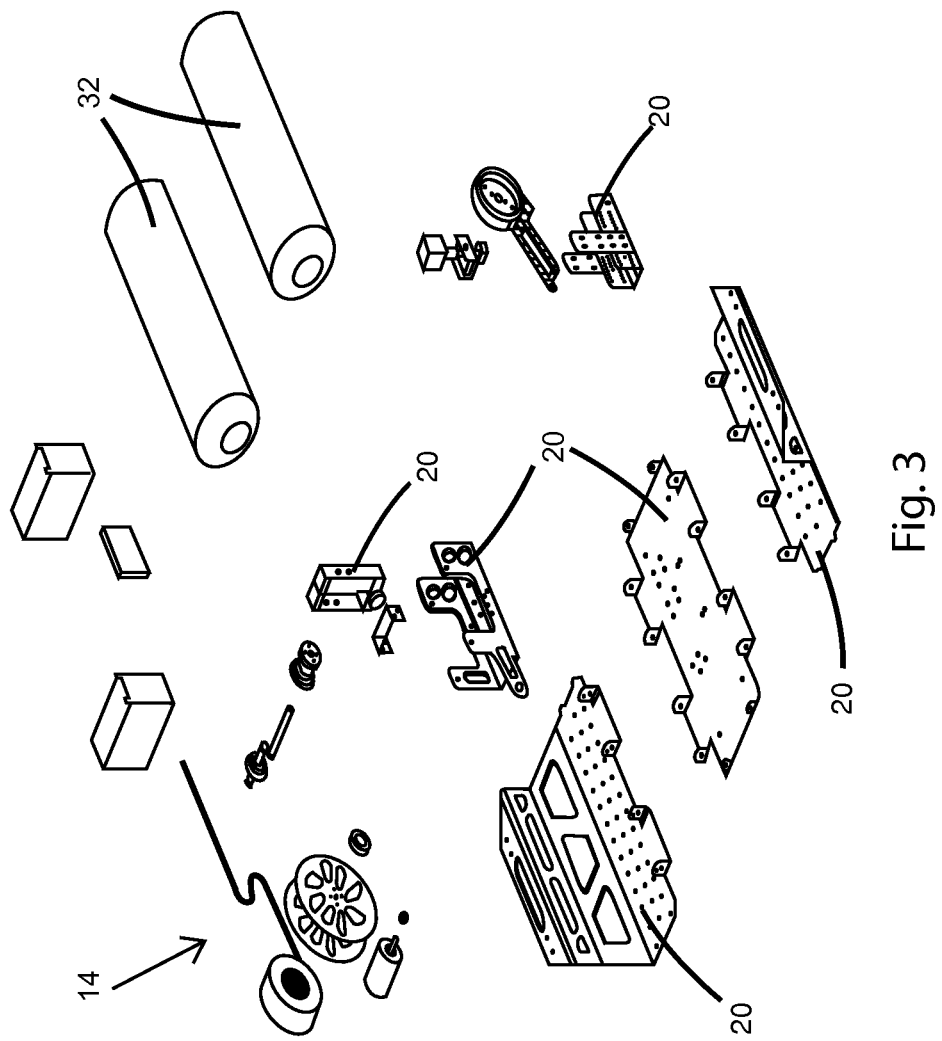

SPRINT TRAINER AID

PRIORITY/CROSS-REFERENCE TO RELATED APPLICATIONS

This application is a continuation-in-part of non-provisional application Ser. No. 13/043,351, and also claims priority of U.S. Provisional Application No. 61/311,593, filed Mar. 8, 2010, and U.S. Provisional Application No. 61/316,145, filed Mar. 22, 2010, disclosures of which are incorporated by reference.

TECHNICAL FIELD

The presently disclosed and claimed inventive concept relates to a device to be used for increasing the speed of a sprinter, and more particularly to a sprinter training aid which pulls the sprinter forward in order to strengthen his running muscles by use of over speed.

BACKGROUND

Running requires the muscles of the leg to lift the leg up and then pull the leg down. The speed and rate of the leg going up must match the speed of the leg going down. Following the premise that a chain is as strong as its weakest link, the runner's rate of turnover (strides per second) is limited by whichever muscle group is the weakest or slowest (the muscle group that lifts the leg or the muscle group that lowers the leg).

The lower back-glute-ham group of muscles that drives the legs down includes much bigger muscles than the hip flexor group which pulls the leg up. Additionally, the lowering of the leg is assisted by gravity while the hip flexor group has to work against gravity to get its work done to pull the leg forward and up. It is for these reasons that the hip flexor group is the limiting factor in stride frequency, and requires the most developmental focus if increased speed is the goal. The sprinter training device of the invention is designed with this in mind, to increase the athlete's stride frequency by increasing the power generated by the hip flexor group. It achieves this by altering the run cycle so that the hip flexor group is targeted for muscle development, much like lifting weights for the hip flexor group.

The following formula is a description of the physics of hip flexor movement.

Hip Flexor Power Development:
A. The leg has a defined weight.
B. The swinging leg, on its way backward, moves at a measurable speed.
C. Weight (load)×Speed=Power.

The weight of the leg multiplied by the speed that the leg is moving will determine the power required to stop the limb and change its direction and move it forward. By forcing an athlete to run faster than the athlete's unassisted speed, the speed factor of the power equation is modified and therefore, the athlete's power is increased. It is in the increase in power that allows the athlete to achieve higher speeds and thus have greater speed endurance.

Fast Twitch Maintenance:
By causing the muscles of the leg to be energized in a more rapid sequence, the nervous system of the sprinter's leg is adapted to faster firing of the muscles involved in the run cycle.

Nervous Adaption:
If a runner ran downhill for 30 meters, he/she would most certainly run faster than a flying 30 meter run (natural, unassisted maximum velocity). This is because the nervous system is much more cooperative when the muscles that are innervated are relaxed.

However running downhill has been shown to not be the optimal way to increase speed. When running downhill, the runner is assisted by gravity, which tends to continue to accelerate the runner to his/her terminal speed, a condition in which relaxation is not possible. The pattern of nerve innervation and muscle firing sequence is altered from that of the unassisted running cycle. When the maximum over speed rate is achieved when running downhill, the runner adapts his run cycle, muscle innervation sequence and muscle firing pattern to cause the runner to lean backwards, apply breaking pressure to the feet when they are on the ground to absorb increased foot strike from the downhill posture, and in many subtle ways to change the downhill run cycle from that of the unassisted run cycle.

Downhill running puts the ankle joint at an unnatural position concerning the initial heel contact. It extends the ankle joint, negating its ability to add impulse to the body. By contrast, the machine of the invention allows the runner to have the same ankle position that he would use if he were unassisted. Because the runner is not at his or her maximum velocity, the runner does not "put on the brakes" nor change his posture, shifting the center of gravity backward.

Natural Running Curve:
All runners have to overcome the load of the body at the beginning of any run. Use of the motor of the device to pull the runner backward at the start of the sprint adds a slight load to the runner in order to exaggerate the runner's normal load (inertia). Running downhill or with the assistance of a bungee cord, for example, removes this normal load and is counterproductive to acceleration training.

SUMMARY OF THE DISCLOSURE

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

This invention relates to a device for helping a sprinter develop muscles for running faster and to help the sprinter train in order to run faster. The device of the invention helps the runner run faster by addressing all three modes of improvement listed above, by pulling the runner forward with a cable attached to the sprinter. Training is accomplished by pulling the runner forward at a carefully controlled rate, which is based upon either the unassisted speed of the runner to which a percentage of over speed is applied, or a setting a line pressure to be maintained on the cable attached to the sprinter. With this acceptable range of comfortable over speed applied, the runner does not enter the over speed zone of the run cycle, which would be experienced in downhill running and which would cause a runner to shift to a braking and downhill style of running.

Since the runner is pulled forward at a slightly faster speed than his unassisted speed, the muscles of the hip flexor group are forced to work harder in pulling the leg forward for the next stride. Being within the comfortable over speed zone allows the athlete to relax and maintain his running form at above normal speeds, with the result being targeted workouts to the hip flexors.

The device of the invention may be used in tandem, two to a runner. In such case, the parts of the devises are referred to as "first cable" or "second cable", for example. Use of the device in tandem would include a device pulling the runner forward, and a device pulling the runner backward at the start of the run. The device of the invention includes a first harness which is placed around the runner, such as around the runner's waist. Attached to the harness is a first cable which extends to a first motor which has a first cable winding reel for taking in and letting out the first cable. The first cable can be made of any number of materials, such as nylon line, steel cable, line similar to monofilament fishing line, braided line, or any number of similar materials. The device includes a computer in which the sprinter's information can be entered. The information to be entered can include the sprinter's name or number, his unassisted speed, and the percent of over speed which is desired. Also enterable into the computer is the distance the sprinter wishes to set as a training distance, the line tension to be maintained, and the percent of over speed to be achieved. For instance, the practice race could be anywhere from 30 to 100 or more meters. The machine may be configured to send data to a central database if more than one machine is in use, for recording multiple athletes information, with the central database being on a coaches laptop or in his office, for instance.

The device has an auto release link. This can be a friction, magnetic, or other type of release which releases under a predetermined amount of force. The auto-release would release the runner from the motor if the runner fell down, for instance, or if the runner was not prepared to start at the beginning of the race. Typical line pressures to achieve over speed running would not typically pull a runner over, and could be in the range of 8-15 pounds. This amount of force could be easily resisted by a standing or running sprinter.

The machine can have a second unit which will work in concert with the first unit. The first unit could be called the assistance motor, and pulls the sprinter forward. The second unit is called the resistance motor and applies a pulling force on the sprinter which will cause drag at the beginning of the run. This initial period of resistance works the muscles used in overcoming the sprinters inertia in take off, and after the start of the run the assistance motor will cause extra speed as the resistance cycle is finished. The second unit can be identical to the first, with a second motor, second cable winding real, second cable, second harness, second power source, second device frame, second computer, second capstan, second cable meter, second cable feed reel, etc.

The resistance motor will typically activate at the same time as the assistance motor, coordinated by wireless communication. At that time the resistance motor will have the higher (reverse) pulling force value thereby providing more resistance than assistance. The resistance motor will gradually reduce its resistance to zero, thus allowing the assistance (forward) motor full control and transitioning from resistance to assistance within the same run. The sprinter will experience higher power requirements (reduced speed) at the beginning of the run and higher speed requirements from the transition on to the assistance dominated part of the run.

Both units working together at the same time can thus overload the entire spectrum of a sprint. The overload that is experienced while training with the machine allows the sprinter to transition from power to speed much faster when that load is removed. This overloads the complete cycle of a sprint, and is like weight lifting for sprinters.

The device can include a start mode and a finish mode. In the start mode, the cable would begin to be taken up by the motor in the reel at a gradual rate until the runner had accelerated to his top unassisted speed. At that point, the motor and cable would continue to accelerate to the percentage of over speed or line tension that had been selected. Similarly, as the runner approaches the finish of the measured distance, as determined by the amount of cable that has been taken up into the device, the pulling motor would begin slowing down its pulling of the cable, until there was just enough pressure on the cable to keep the slack out of the cable. The motor and cable will ideally about seven pounds of maximum load to the harness on the runner, and that load may be adjustable at the discretion of the coach, athlete, or other user.

The start mode can be initiated from an audio feedback, such as the runner or someone else yelling, "start," or "go," or by the sound of a starting pistol or by a remote control, or by stepping or off of a pad. The computer and the motor module could also initiate the start by a countdown to the starting gun, and an audio signal to initiate the start of the race. The device could also be set to an auto-start mode, in which the cable begins to be taken in as soon as line slack in the cable is detected.

BRIEF DESCRIPTION OF THE DRAWINGS

FIG. 3 is an exploded view of a sprinter training device of the disclosed technology.

DEFINITIONS

Figure 1:
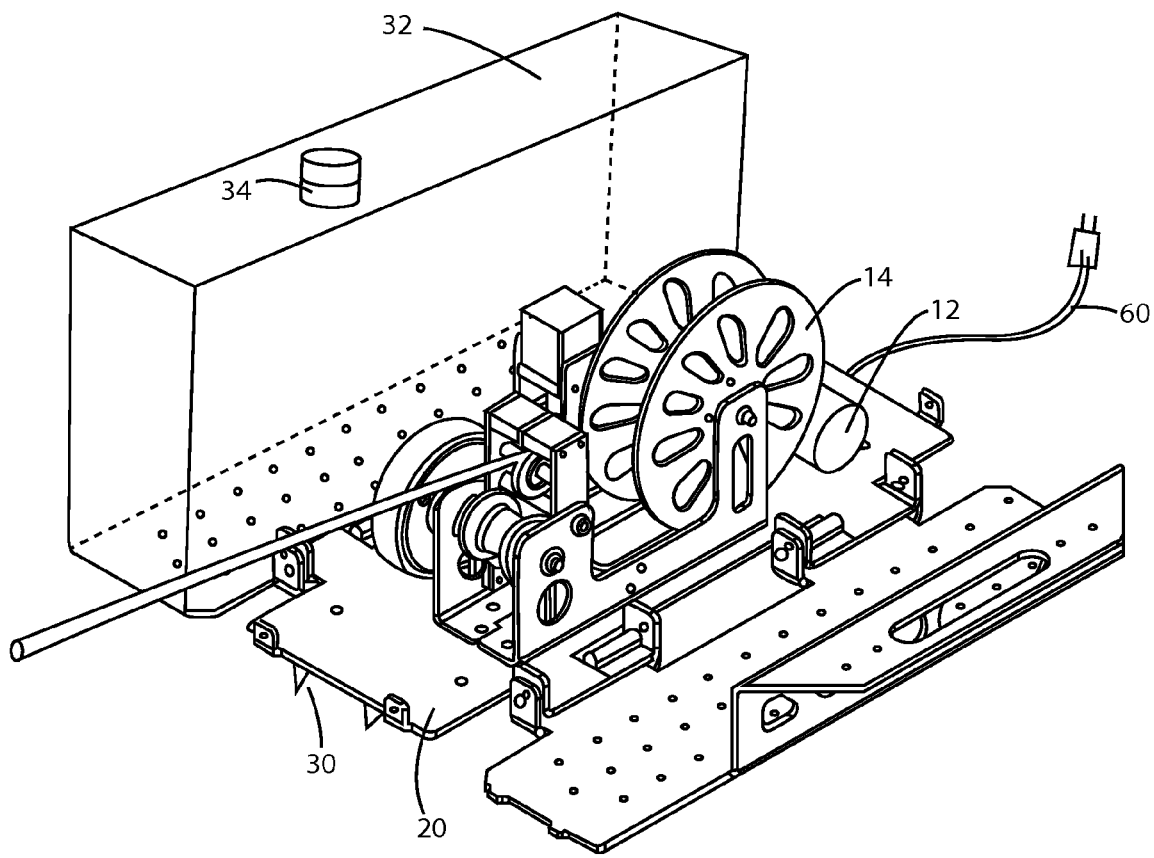
FIG. 1 is a perspective view of a sprinter training device of the disclosed technology.

In the following description and in the figures, like elements are identified with like reference numerals.

DETAILED DESCRIPTION OF THE EXEMPLARY EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims. Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature. The claims and no other part of the application define the scope of the claimed technology.

Figure 2:
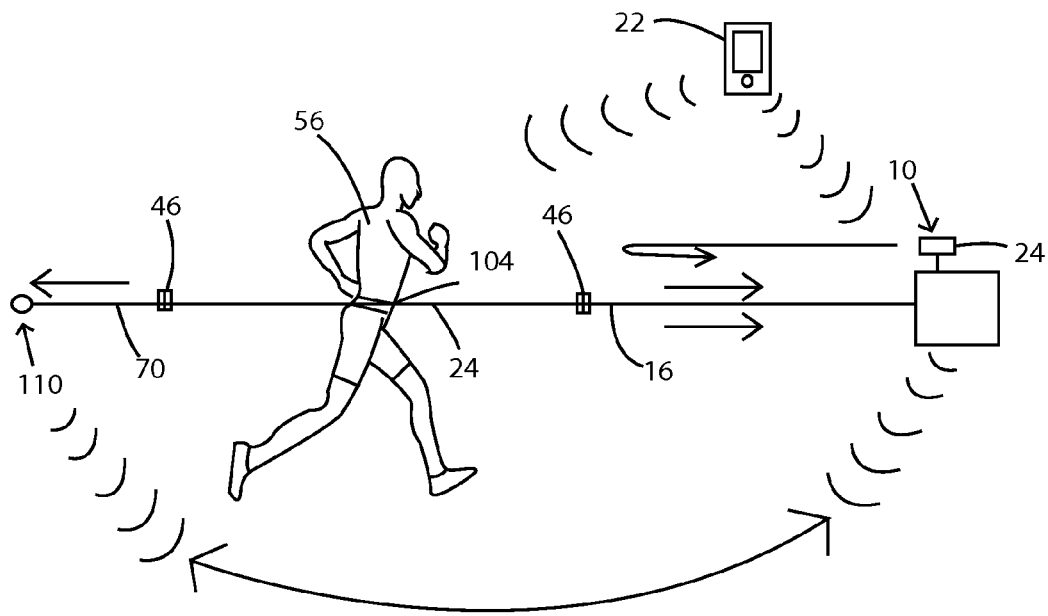
FIG. 2 is a view of a runner being attached to two of the sprinter training devices.

Shown in FIGS. 1 through 2 are certain preferred embodiments of the disclosed technology. Many of the features of this preferred embodiment are optional, and the technology itself is defined by the claims and not by the preferred embodiment described below.

The disclosed technology is a sprinter training device 10. The sprinter training device 10 basically extends and retracts a cable 16 which attaches with a harness 104 to the waist of a sprinter or other type of athlete. In one mode, a sprinter pulls out the cable to a position distant from the sprinter training device 10, and at the initiation of a sprint the sprinter training device 10 reels in the cable 16 at a rate which places a predetermined load on the cable which pulls the sprinter forward at a rate faster than his normal pace.

Shown in FIG. 1 is the sprinter training device 10 mounted in a device frame 20. The device frame 20 is shown in FIG. 1 as basically a rectangular structure in which are housed various components of the device. Obviously the device frame can take other shapes, but this particular example is shown as one preferred embodiment. The device is preferably controlled from a remote location, so that data is transferred from the device to a computer which records data for a number of runners and which records a number of practice runs for comparison. Wireless connection using bluetooth, wifi, infrared, or cell phone technology are all possible.

In the device shown in FIG. 1, a motor 12 is mounted on the bottom shelf of the frame. As shown in FIG. 2, use of the device can involve the use of a first device 10 and a second device 110. In a set up in which two devices are used, the parts of the first device are designated by the term first, as in first motor, first cable winding reel, first cable, etc. The equivalent parts in the second device 110 are designated second motor, second cable winding reel, second cable, etc.

Shown in FIG. 1 is a first motor 12 attached to a shelf of the device frame 20. The motor is attached to a cable winding reel 14 around which is wrapped a length of cable 16. Cable 16 is routed around a capstan 38, and around a tension pulley 36. The tension pulley 36 is attached to the frame and is configured to rotate back and forth. The purpose of the tension pulley 36 is so that fluctuations in the rate of uptake of the cable 16 caused by irregularities in the sprinter's movement can be accommodated by the tension pulley 36 moving back and forth and keeping a constant tension on the cable. After passing over a capstan 28, and over the tension pulley 38 the cable 16 passes out of the sprinter training device 10 and extends to the sprinters location, and is attached to the sprinter by a harness 104 such as a belt around his waist.

The device shown in FIG. 1 also includes a cable feed reel 14, which rotates as cable 16 is fed over the feed reel 14. The amount of cable that has been retracted from the device can be measured and tracked by use of a measuring device on the cable feed reel 14, and a cable meter 40 mounted adjacent to the cable feed reel 14.

One way in which the length of cable which has been extended or retracted can be thus tracked with the cable feed reel and the cable meter is by use of a sensor using magnets. For instance, a magnet can be placed on the cable feed reel 42 and sensed by a first cable meter 40. By use of the Hall Effect, which is utilized in bicycle cyclometers as an example, the number of rotations of the reel 14 can be converted to inches of cable 16 which has been extended. Use of a Hall Effect type sensor is only one example of how the line could be metered, in a meter using mechanical gears to calculate distance or a magnetic read switch can also be utilized, as could other measuring technologies. Sensing the position of the runner is also possible using other means, such as a laser or IR sensor 24, which would bounce a beam off the runner to determine such information as start time, distance, speed, etc.

Shown in FIG. 1 is the power source 18, which in this case are batteries 52. An alternative power source is provided by use of the power cord 60 which can operate the device or charge the batteries. Included in the device shown in FIG. 1 is a transmitter 26 which is utilized to coordinate tension on the cable 16, to record the runner's names and unassisted sprint times, and to calculate the percentage of over speed or line tension to apply to the runner. The runner or the coach may enter a percentage of over speed to be applied to the runner, or they may specify a line tension to be steadily maintained as the runner approaches the training device 10. Control of the device by cell phone, laptop, tablet or other remote control platforms is preferred.

FIG. 2 shows the training device 10 in operation with a runner 56 and a second unit 110. In most cases the second unit 110 would be identical to the first unit 10 but since the first unit 10 can take a number of configurations, the second unit 110 could also take different configurations. Shown in FIG. 2 is a sprint training device 10 with a cable 16 attached to the sprinter 56 by a harness 104. Included in the cable 16 is an auto release link 46. A second auto release link 46 is shown behind the sprinter 56. The auto release link can be a device which pulls apart at a predetermined pressure. This could be a friction type release mechanism, and it could also be magnetic, it could also be something as simple as hook and loop type fasteners stuck together. The amount of force applied through the cable to the runner's waist would typically be an amount of force from 5 to 15 pounds, and if the runner simply stopped running, the cable 16 would not pull him off balance. He could easily stop, stand, or back up against the force applied by the cable 16. Shown in FIG. 2 is an extending brace 44 which is an optional feature and is a folding leg which is attached to the device frame 20. It provides additional stability to the device as the cable applies pressure to the runner. When using two devices 10, one device serves to pull the runner forward, and the one in the rear of the runner serves to pull the runner backward. The two units are configured to communicate with each other, so that a coordinated cycle of pulling the runner forward at certain times, and pulling the runner backward at certain times can be created. For instance, when the runner leaves the blocks, the coach may want backward resistance to the runner reaching top speed. When the runner reaches top speed, the coach may want overspeed training to train the muscles groups that are limiting for fast leg turnover.

In addition to two units, one pulling the runner forward and one pulling the runner backward, the device 10 is capable of operation with more than two units attached to a single runner or other type of athlete. Two additional units could be placed on the left and right of a runner, and could apply a combination of sideways and forward and backward pressure. This would be used by a player who needs to develop lateral agility and ankle strength, such as a football or soccer player. The side to side pressure could help an athlete build up ankle stability.

Not shown are several optional buttons which may be placed on the unit on the control screen of a remote control 22 for remotely controlling the use of the device. These can include an on/off switch, a retract button for retracting cable, and a kill switch for turning the device off. Other controls could be presented on the monitor 56 such as by a touch screen or by use of a mouse or keyboard.

Use of the machine would typically involve initiation of a start cycle, with the first device 10 applying only enough pressure to keep the slack out of the line during the start phase. During the start phase the second device 110 would apply a predetermined amount of force to the runner in order to give the runner a workout for his initiation muscles. The start cycle would quickly phase out, and for the rest of the run the training device 10 would apply the prescribed forward pressure to the runner 56 and cause him to run faster than he would if unassisted.

The device can also include fold out sections of the frame, with the fold out sections providing platforms for placement of weights to secure the device to the track. One type of weight that is used is a hollow plastic container, called a stabilizing tank 32, which may be filled with water through a fill cap 34 at the track, and which sits on the fold out structures. Projecting spikes 30 can be placed on the underside of the frame 20.

Use of the device can also include a finishing cycle, in which the tension applied to the front of the sprinter 56 tapers off until there is just enough pressure to keep the slack out of the line.

The device 10 would preferably include a database either on the frame or on an app on a control device 22, for record keeping and all of the features of the disclosed technology. Those features include record keeping, force production per athlete, force per pound of body weight, backwards performance comparison within the current workout to determine performance dropoff and over training. On board sensors are configured to use multi directional force which is coordinated between multiple devices 10. These sensors sense a change of direction in the athlete, and adjust the cable tension on the training devices accordingly.

FIG. 3 is an exploded parts view of an embodiment of the disclosed technology. FIG. 3 shows frame 20 as a series of parts whereon cable winding reel 14 is attached.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A sprinter training device, comprising:
   a device housing, for placement of device components;
   a first motor attached to said device housing, with a first cable winding reel attached to said motor, with said reel and motor combination configured to let out and take in a first cable to maintain a predetermined line tension;
   a power source for said motor;
   a first harness attached to a first end of said cable, for attachment to an athlete, with said first cable having a second end attached to said first cable winding reel; wherein,
   said first motor is configured to pull said sprinter toward said first motor by taking in said first cable fast enough to maintain a selected line pressure on said first cable in order to pull said sprinter toward said sprinter training device;
   a hollow stabilizing tank which is fillable with water, and which is configured for attachment to said device housing, for securing said device housing in a fixed position by weight of said stabilizing tank.

2. The sprinter training device of claim 1 which further comprises at least one fold out platform structure attached to said device housing, which folds up for transport of said device, and which serves as a mounting base for said stabilizing tank when folded up.

3. The sprinter training device of claim 1 which further comprises a computing means for storing athlete information and data, and for inputting a line pressure to be maintained as said sprinter approaches said first motor and first cable winding reel.

4. The sprinter training device of claim 3 in which said computer includes a database of sprinters' unassisted speeds for selected distances, and a means for inputting a selected percent of over speed to retract said cable in order to pull said sprinter toward said first motor with a preselected tension on said first cable.

5. The sprinter training device of claim 3 in which said computer further comprises a start cycle which takes in said first cable after a start of a run to match the sprinter's acceleration, and gradually increases take up speed until a calculated over speed rate is achieved.

6. The sprinter training device of claim 1 which further comprises a first cable meter, for measuring the length of first cable as it is pulled out.

7. The sprinter trainer device of claim 6 in which said first cable meter is built into said first cable winding reel.

8. The sprinter trainer device of claim 3 which further comprises an intercommunication module configured to enable multiple sprinter training devices to communicate with each other, so that multiple cables from multiple devices may be connected to an athlete, with said computer means of the devices are configured to coordinate line pressures to said athlete, to either pull an athlete backwards, forwards or sideways in a coordinated fashion to either resist sand athlete's progress, or to accelerate said athlete's progress.

9. The sprinter trainer device of claim 8 in which a pair of sprinter trainer devices attach to an athlete and apply both pulling back pressures and pulling forward pressure on said cables, at different parts of the athlete's run from one sprinter training device toward the other.

10. The sprinter training device of claim 6 in which said computer includes a database of sprinters' unassisted speeds for selected distances, and a means for inputting a selected percent of over speed to retract said first cable in order to pull said sprinter toward said first motor with a preselected tension on said first cable.

11. The sprinter training device of claim 6 in which said computer further comprises a start cycle which takes in first cable after a start of a run to match the sprinter's acceleration, and gradually increases take up speed and line pressure until the calculated over speed rate is achieved.

12. The sprinter training device of claim 1 which further comprises a first extending brace attached to said frame for stabilizing said device against a pull by said cable being retracted by said first motor.

13. The sprinter training device of claim 1 in which a start cycle is initiated by said computer sensing slack in said first cable as the sprinter begins to run.

14. The sprinter training device of claim 1 in which said cable further comprises an auto release link, for disengaging said cable from said motor upon reaching a selected release tension.

15. The sprinter training device of claim 1 which further comprises a second device frame with a second motor and a cable winding reel, configured to let out and take in a second cable to maintain a predetermined line tension, with a power source for said second motor, with a second harness attached to a first end of said second cable, for attachment to said sprinter, with said second cable having a second end attached to said second cable winding reel; wherein,
   said second motor is configured to pull against said sprinters forward motion away from said second motor, by letting out second said cable fast enough to maintain a selected line pressure on said cable in order to present a rearward pull on said sprinter simultaneous to said forward pull from said first cable.

16. The sprinter training device of claim 11 which further comprises a second computer and a wireless communication with said first computer for coordination of cable retraction and release.

17. The sprinter training device of claim 11 which further comprises a second computer for inputting a line pressure to be maintained as said sprinter recedes from said second motor and said second cable winding reel.

18. The sprinter training device of claim 11 which further comprises a start cycle in which said cable winding reel and said second cable winding reel are both delayed from applying the selected cable pressure to said sprinter for a short period of time as the sprinter starts.

19. The sprinter training device of claim 1 which further comprises a data collection function for saving data from each run cycle, for later analysis of run data.

20. A sprinter training device, comprising:
a first motor with a first cable winding reel, configured to let out and take in a first cable to maintain a predetermined line tension;
a first power source for said first motor;
a first training device frame comprising a mounting position for said first motor and other components;
a first harness attached to a first end of said first cable, for attachment to a sprinter, with said first cable having a second end attached to said first cable winding reel;
a first cable feed reel with a first cable measuring unit for tracking how much cable has been pulled out, said first cable feed reel for feeding out first cable from said first cable winding reel;
a computer for inputting a line pressure to be maintained as said sprinter approaches said first motor and first cable winding reel, and for shutting off said first motor when a measured amount of extended first cable has been retracted;
a hollow stabilizing tank which is fillable with water, and which is configured for attachment to said device housing, for securing said device housing in a fixed position by weight of said stabilizing tank; wherein,
said first motor is configured for retracting first cable at a rate to maintain a selected line pressure on said first cable in order to pull said sprinter forward faster than he could otherwise run.

21. A sprinter training device, comprising:
a first motor with a first cable winding reel, configured to let out and take in a first cable to maintain a predetermined line tension;
a first power source for said first motor;
a training device first frame comprising a mounting position for said first motor;
a first harness attached to a first end of said first cable, for attachment to a sprinter, with said first cable having a second end attached to said first cable winding reel;
a computer for inputting a line pressure to be maintained as said sprinter approaches said first motor and first cable winding reel
a second device frame with a second motor and a second cable winding reel, configured to let out and take in a second cable to maintain a predetermined line tension, with a power source for said second motor, with a second harness attached to a first end of said second cable, for attachment to said sprinter, with said second cable having a second end attached to said second cable winding reel; wherein,
said second motor is configured to pull against said sprinters forward motion away from said second motor, by letting out second said cable fast enough to maintain a selected line pressure on said cable in order to present a rearward pull on said sprinter simultaneous to said forward pull from said cable; wherein,
said first motor is configured to pull said sprinter forward toward said motor by taking in said cable fast enough to maintain a selected line pressure on said cable in order to pull said sprinter forward faster than he could otherwise run, and said second motor is configured to pull said sprinter toward said second motor, with said second motor pulling more at the start of said sprint, and said second motor pulling less at the end of said spring.

* * * * *